(12) United States Patent
Salamey

(10) Patent No.: US 9,948,171 B1
(45) Date of Patent: Apr. 17, 2018

(54) POSITIVE DISPLACEMENT INDUCTIVE PUMP

(71) Applicant: Laurence R. Salamey, Sarasota, FL (US)

(72) Inventor: Laurence R. Salamey, Sarasota, FL (US)

( * ) Notice: Subject to any disclaimer, the term of this patent is extended or adjusted under 35 U.S.C. 154(b) by 598 days.

(21) Appl. No.: 14/082,627

(22) Filed: Nov. 18, 2013

(51) Int. Cl.
| | |
|---|---|
| *H02K 44/06* | (2006.01) |
| *F04B 17/04* | (2006.01) |
| *F04B 1/02* | (2006.01) |
| *H02K 44/02* | (2006.01) |

(52) U.S. Cl.
CPC .......... *H02K 44/06* (2013.01); *F04B 17/042* (2013.01); *F04B 1/02* (2013.01); *F04B 17/046* (2013.01); *H02K 44/02* (2013.01)

(58) Field of Classification Search
CPC ..... H02K 44/06; F04B 17/046; F04B 7/0076; F04B 2203/0403; F04B 2203/0203; F04B 17/042
USPC .......................................................... 417/418
See application file for complete search history.

(56) References Cited

U.S. PATENT DOCUMENTS

| | | | | |
|---|---|---|---|---|
| 3,162,134 | A * | 12/1964 | Lovell | F04B 17/046 318/125 |
| 3,348,489 | A * | 10/1967 | Meyer | F04B 17/046 417/417 |
| 3,894,817 | A * | 7/1975 | Majoros | H02K 33/06 310/30 |
| 4,317,058 | A * | 2/1982 | Blalock | H02K 7/065 310/24 |
| 5,713,728 | A | 2/1998 | Salamey | |
| 5,899,672 | A * | 5/1999 | Salamey | F04B 17/044 417/418 |
| 6,851,938 | B2 * | 2/2005 | Ding | F04B 9/00 137/512 |
| 2005/0031466 | A1* | 2/2005 | Chenoweth | F04B 15/08 417/375 |

* cited by examiner

*Primary Examiner* — Devon Kramer
*Assistant Examiner* — Lilya Pekarskaya
(74) *Attorney, Agent, or Firm* — Nicholas Pfeifer; Smith & Hopen, P.A.

(57) ABSTRACT

A positive displacement inductive pump includes a central piston formed of a ferromagnetic material having non-ferromagnetic end pistons that extend from each of its opposite ends. Stationary end walls are mounted to opposite ends of a housing and are centrally bored. First and second inductive coils are alternately energized, causing the central piston and the end pistons to conjointly reciprocate within an axial bore and the end wall central bores, respectively. First and second check valves are positioned outboard of each end wall and allow valve-controlled ingress and egress of material into and out of the axial and central bores. The relative diameters of the central piston and the end pistons are changed to control the relationship between the magnetic force applied and the output pressure for a given volume of fluid.

7 Claims, 4 Drawing Sheets

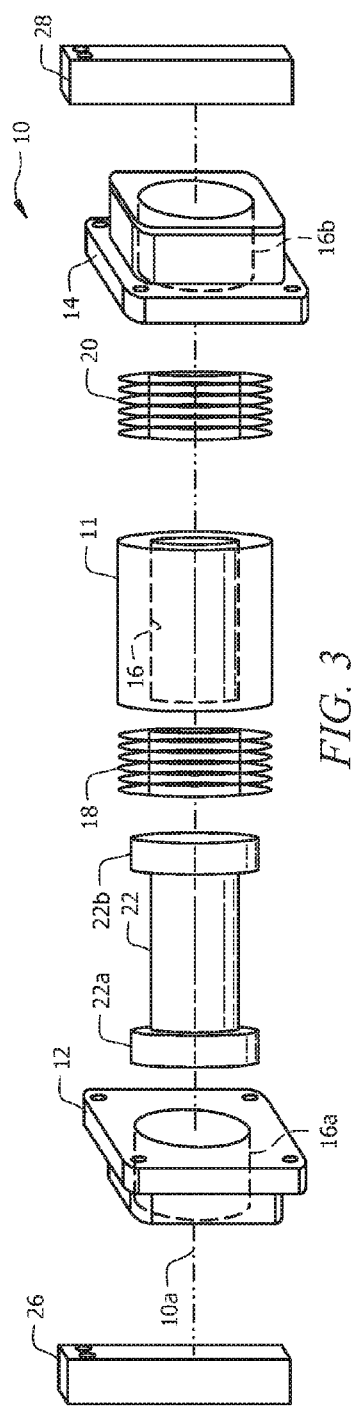
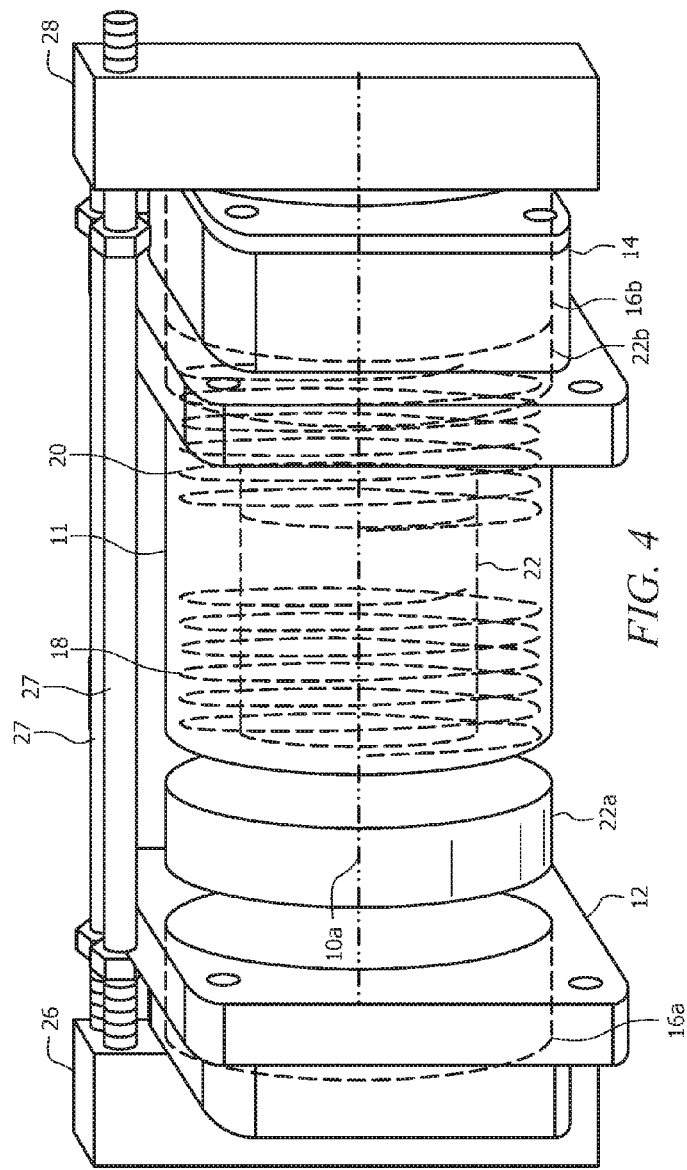
FIG. 3
FIG. 4

POSITIVE DISPLACEMENT INDUCTIVE PUMP

BACKGROUND OF THE INVENTION

1. Field of the Invention

The present invention relates to an improved positive displacement inductive pump.

2. Description of the Prior Art

Positive displacement inductive pumps are generally well known. They are used for delivering measured quantities of a fluid at a desired pressure and rate. Such positive displacement inductive pumps include a piston formed of ferromagnetic material that is disposed within an axial bore for back and forth movement as a result of magnetic fields alternately applied to the piston. A check valve assembly is positioned at each end of the axial bore and closes each end but permits ingress and egress of a material being pumped to respective displacement chambers formed at opposite ends of the axial bore.

The reciprocal movement of the piston is caused by a magnetic field produced by coils surrounding the axial bore. A seal is provided at each end of the piston to seal the sidewalls of the axial bore, either by an external seal or by providing a very close tolerance between the piston and the axial bore. The seal isolates the displacement chambers from the axial bore.

Two inductive positive displacement pumps are disclosed in U.S. Pat. Nos. 5,713,728 and 5,899,672, both to the present applicant, and said patents are incorporated hereinto by reference. When using such pumps, it is often desirable to provide for increased or decreased pressure from the pump without the need for changing the outer physical dimensions or the size of the coils. Moreover, it is desirable to be able to make changes in the pressure in a simple manner. Therefore, there is a need for an improved positive displacement inductive pump where the pressure can be increased for a pump with a given physical size or the volume substantially increased at a lower pressure without requiring the alteration of the outer physical dimensions of the pump.

Moreover, prior art solenoids include a continuous bore from end to end where considerable magnetic flux is lost. Thus there is also a need for an improved positive displacement inductive pump that substantially reduces the loss of magnetic flux.

However, in view of the art considered as a whole at the time the present invention was made, it was not obvious to those of ordinary skill in the art how the needed improvements could be provided.

SUMMARY OF THE INVENTION

The long-standing but heretofore unfulfilled need for an improved positive displacement inductive pump is now met by a new, useful, and non-obvious invention.

The novel structure includes a housing formed of a ferromagnetic material. An axial bore is formed in the housing. First and second end walls are secured to opposite ends of the housing. A central bore is formed in each end wall and each central bore forms a displacement chamber.

A central piston formed of a ferromagnetic material is disposed in the axial bore between the first and second end walls. End pistons formed of a non-ferromagnetic material are formed integrally with the central piston, there being one end piston at each end of the central piston. Each end piston extends into the central bore formed in its associated end wall. A non-ferromagnetic bushing provides an interface between the central bore and its associated end piston. A seal circumscribes each end piston so that the end wall central bores are not in fluid communication with the axial bore.

First and second inductive coils are disposed in the housing around the axial bore between the end walls and are coaxial with the axial bore. The coils are alternately energized to generate first and second magnetic fields that cause the central piston to reciprocate within the axial bore.

First and second check valve assemblies are attached to each end wall, outboard thereof, to close the outboard ends of the end wall central bores while allowing the respective ingress and egress of a preselected material into and out of the central bores as the central piston reciprocates in the axial bore and the end pistons reciprocate within their associated central bores conjointly with the central piston.

In a first embodiment, the diameter of the central bore formed in each end wall and the slightly less diameter of the end pistons is less than the diameter of the central piston. An increase in pressure is thus achieved relative to a prior art inductive piston where no end wall central bores and end pistons are provided.

Each end piston has a length slightly greater than the depth of its associated central bore, thereby preventing contact between the central piston and each of the end walls. The end walls are magnetic poles. This structure prevents short circuiting the magnetic field and allows the force to be extended farther along the axis of the axial bore, i.e., the axial bore is in effect lengthened by the combined lengths of the end wall central bores. The second patent of the incorporated patents discloses maintaining this magnetic gap between the main axial bore and the end walls as a means of increasing the magnetic force, thereby improving the above-mentioned prior art solenoids that include a continuous bore from end to end where considerable magnetic flux is lost.

The effective magnetic diameter of each end wall central bore is essentially the same as the diameter of the central piston because the non-magnetic end pistons keep the central piston centered in the magnetic field. The pressure of the central piston is increased relative to the pressure that would be achieved if the same magnetic force were applied to a central piston having a diameter substantially equal to the diameter of the axial bore and having no end pistons.

In a second embodiment, the diameter of the end wall central bores and of the end pistons is greater than the diameter of the central piston. This difference in diameters provides increased volume with decreased pressure relative to prior art inductive pistons where no end pistons are provided.

In an undepicted embodiment, the diameter of the end pistons is the same as the diameter of the central piston. This produces the same pressure and flow as a central piston with no end pistons.

In a third embodiment, a plurality of substantially parallel, longitudinally extending grooves are formed in the central piston to increase its surface area.

Bushings formed of ceramic or other materials that are suitable for handling harsh chemicals are employed in a fourth embodiment.

An important object of the invention is to provide a positive displacement inductive pump where the pressure can be increased for a pump with a given physical size or the flow volume substantially increased at a lower pressure without requiring alteration of the pump housing.

Another object is to reduce the loss of magnetic flux in such a pump.

Still another object is to provide an inductive pump that can handle materials that cannot be handled by prior art inductive pumps.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 3 is a partially isometric exploded view of a second embodiment;

FIG. 4 a schematic side view of the embodiment of the second embodiment in a partially assembled state;

DETAILED DESCRIPTION OF THE PREFERRED EMBODIMENT

Figure 1:
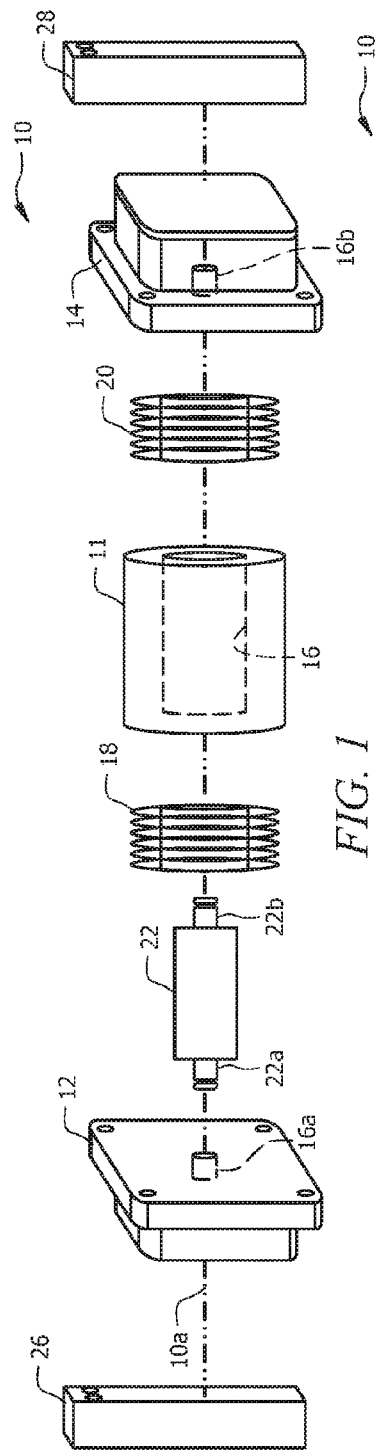
FIG. 1 is a schematic exploded side view of a first embodiment of the novel positive displacement inductive pump.
Figure 2:
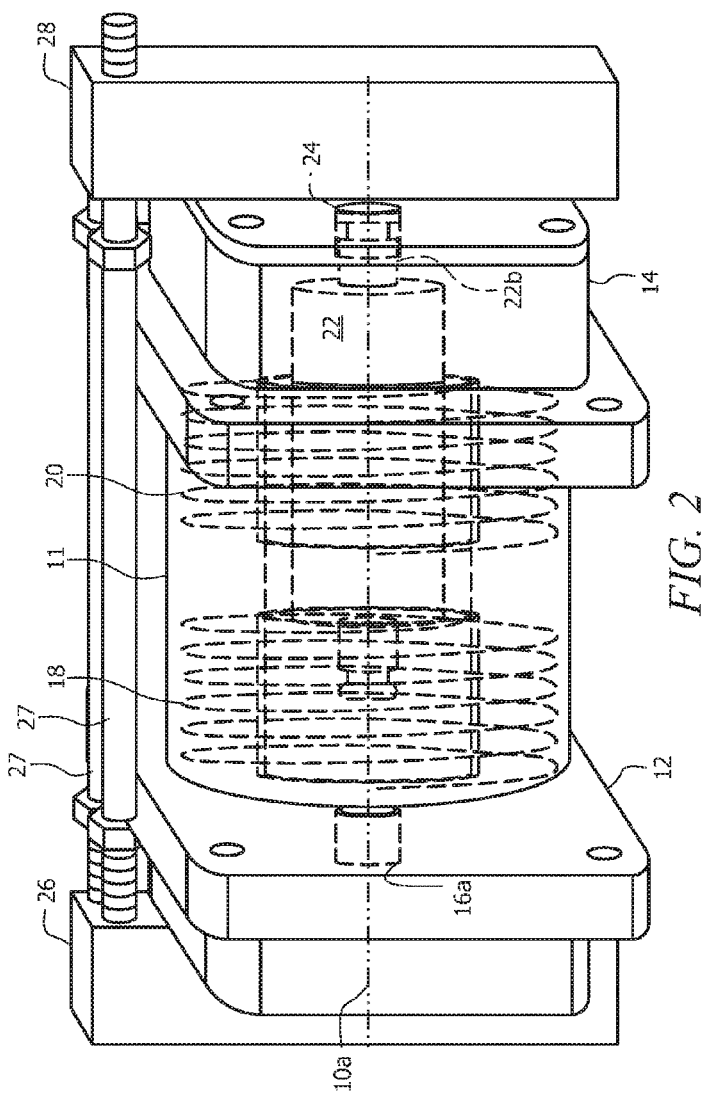
FIG. 2 is a schematic side view of the FIG. 1 embodiment in a partially assembled state.

Referring now to FIGS. 1 and 2, it will there be seen that a first embodiment of the novel positive displacement inductive pump is denoted as a whole by the reference numeral 10.

Pump 10 includes stationary housing 11 having stationary end walls 12 and 14 secured to its opposite ends. Axial bore 16 is formed in housing 11. Central bores 16a, 16b are formed in end walls 12 and 14, respectively and said central bores are in axial alignment with axial bore 16.

In this first embodiment, the diameter of axial bore 16 is greater than that of end wall central bores 16a, and 16b as depicted. This illustration of housing 11 is schematic and may take the form of the housings shown in each of the incorporated patents.

A pair of inductive coils 18 and 20 are coaxial with bores 16, 16a and 16b and surround individual portions of axial bore 16 as depicted in FIG. 2. Coils 18, 20 may be disposed within the housing in any desired manner. For example, they can be wrapped around an outer surface of housing 11 or positioned within the housing as disclosed in FIG. 2.

Inductive coils 18 and 20 are alternately energized in a known manner to produce respective first and second induced magnetic fields. A magnetic circuit may also be provided within housing 10 to enhance the magnetic fields. Such a magnetic circuit may, for example, be as disclosed in the two incorporated patents, and generally consists of three magnetic members or pole pieces of a ferromagnetic material that are disposed transverse to the longitudinal axis of axial bore 16, with each having a bore that is coaxial with axial bore 16. These three members are disposed symmetrically within housing 10 so that each coil 18 and 20 is disposed between an adjacent pair of these three magnetic members or pole pieces. Two further pole pieces are provided which are disposed opposite one another and contact opposite peripheral edges of the three transversely extending pole pieces.

Central piston 22 is slideably mounted in axial bore 16 as understood from FIGS. 1 and 2. It is formed of a ferromagnetic material and is displaced back and forth (left and right as drawn in FIGS. 1 and 2) within axial bore 16 upon alternate energizing of inductive coils 18 and 20. Nonferromagnetic end pistons 22a, 22b extend from opposite ends of piston 22 and said end pistons are coincident with a longitudinal axis of symmetry 10a of pump 10 as indicated in FIG. 1. The length of central piston 22 and the diameter of housing 11, including end walls 12 and 14, are such that end pistons 22a, 22b reciprocate within end wall central bores 16a, 16b. Said central bores 16a, 16b define displacement chambers of a given volume.

Peripheral seals, collectively denoted 24, 24, are secured to end pistons 22a, 22b to prevent fluid in displacement chambers 16a, 16b from entering into the interior of housing 11. Under certain circumstances the sealing can be achieved by tight tolerances with regard to the outer dimension of end pistons 22a, 22b and the interior surface of central bores/displacement chambers 16a, 16b.

Check valve assemblies 26, 28 are positioned adjacent the outboard end of each end wall 12, 14 and are interconnected to one another by conduits 27, 27. These check valve assemblies are in communication with central bores 16a and 16b, respectively, and enclose the outboard end of said central bores while allowing the respective ingress and egress of material into and out of the central bores in dependence on the respective directional movement of central piston 22, all in a known manner as described in detail in the incorporated disclosures.

In a conventional positive displacement inductive pump the lone piston has a uniform diameter along its extent which is generally dictated by the size of the displacement chamber. Thus, if it is desired to provide an increased pressure, the increase must be achieved by an increase in the strength of the magnetic field.

However, for practical reasons, it is not always possible to achieve the desired result in that manner. It has been observed from calculations and empirical testing that the magnetic flux operating on a ferromagnetic piston has its greatest effect at the surface of the piston, and that the force applied to the piston is directly related to the surface area of the portion that is subjected to the magnetic field. Thus, for a piston of a given diameter for displacing a given volume of fluid, the pressure can be increased substantially by increasing the surface area of the portion of the piston subjected to the magnetic field. This can be accomplished in a number of different ways.

In the embodiment of FIGS. 1 and 2, the pressure increase on the hydraulic side of the pump is attained by providing end pistons 22a, 22b and sizing the diameter of central piston 22 to be greater than the common diameters of said hydraulic end pistons 22a, 22b.

Since the relationship between the surface area of the central piston, and thus the force produced on said piston, and the surface area of the hydraulic end pistons are related to their relative sizes, it is also possible to provide a pressure variation when for a given force, a pressure decrease is desired. If the magnetic force is known, the decrease in pressure can be achieved by providing an increase in volume of the displacement chambers 16a, 16b relative to the volume of axial bore 16.

Accordingly, as depicted in FIGS. 3 and 4, the respective diameters of the non-magnetic end pistons 22a, 22b are increased relative to the diameter of central piston 22, and the respective diameters of central bores 16a, 16b formed in end walls 12, 14 and thus the size of the respective displacement chambers 16a, 16b is increased relative to the diameters of the first embodiment.

More particularly, in the first embodiment, the diameter of central piston 22 exceeds the common diameter of end pistons 22a, 22b and in the second embodiment, the common diameter of end pistons 22a, 22b exceeds the diameter of central piston 22. In an undepicted embodiment, the common diameter of end pistons 22a, 22b is substantially equal to the diameter of central piston 22.

Central piston 22 and end pistons 22a, 22b may be manufactured by machining from a single cylindrical blank to reduce the diameter of central piston 22, or by providing end walls 12 and 14 with a larger diameter than said central piston, and securing said stationary end walls to opposite ends of housing 11 so that central piston 22 can reciprocate within axial bore 16.

In this second embodiment, central bores/displacement chambers 16a, 16b slidingly receive end pistons 22a, 22b just as in the first embodiment and pump 10 operates in the same way as the first embodiment of said pump. With this arrangement, and for a given magnetic force, the volume of fluid pumped is increased and the pressure developed by the fluid is decreased. In the undepicted embodiment where the diameter of the end pistons is the same as the diameter of the central piston, and for a given magnetic force, there is no change in the pressure or rate of flow relative to the pressure and rate of flow of a central piston having no end pistons.

As in the first embodiment, end pistons 22a, 22b may be coated to provide a seal between said end pistons and central bores/displacement chambers 16a, 16b. Alternatively, a separate seal as shown for the embodiment of FIGS. 1 and 2 may be provided.

It is also possible to provide an increase in surface area of central piston 22 by forming indentations in the piston surface, which in effect increases the circumferential surface area of the piston.

Figure 5:
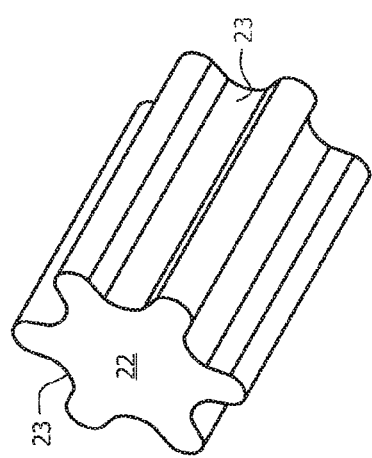
FIG. 5 is an isometric view of an alternative embodiment of a piston having an increased surface area.

FIG. 5 depicts central piston 22 having surface indentations or grooves 23, preferably substantially parallel to one another, formed therein along the length of said piston 22. Other type of indentations are within the scope of this invention.

When using a piston such as the FIG. 5 embodiment of piston 22, some other arrangement must be provided for sealing such a piston in displacement chambers 16a and 16b. Such a seal, for example, could be a seal such as seal 24 which has an inner surface corresponding to the grooved surface of piston 22. Alternatively, central bores 16a and 16b could have a shape which matingly engages the circumference of piston 22, thereby eliminating end pistons 22a, 22b.

Increasing the surface area of central piston 22 by forming such indentations has the same effect as the first embodiment, i.e., the pressure is increased relative to the pressure achieved when the surface area of the piston is not increased.

Figure 6:
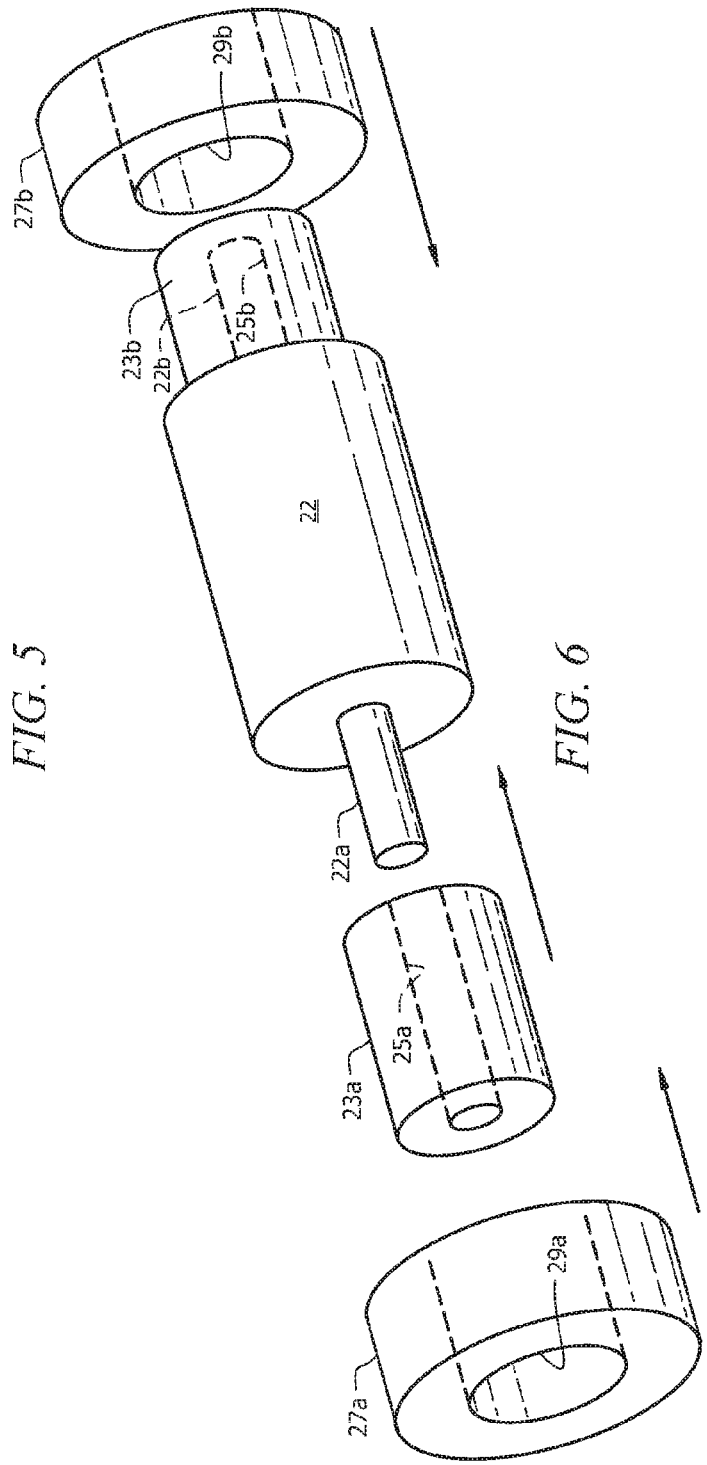
FIG. 6 is an exploded view of a fourth embodiment.

A fourth embodiment, depicted in FIG. 6, also includes ferromagnetic central piston 22 and non-ferromagnetic end pistons 22a, 22b. Ceramic bushings 23a, 23b are centrally bored as at 25a, 25b and are fixedly secured to end pistons 22a, 22b, respectively, for conjoint movement therewith. The ceramic bushings perform the same function in this fourth embodiment as end pistons 22a, 22b in the first two embodiments.

Ceramic bore bushings 27a, 27b are centrally bored as at 29a, 29b and are stationary and thus are the equivalent of end walls 12 and 14. Each of said central bores slideably receive their associated ceramic bushings 23a, 23b when magnetic central piston 22 is caused to reciprocate by alternating magnetic fields generated by coils 18, 20.

As in the other embodiments, no seals are needed if the tolerance between the external diameter of ceramic bushings 23a, 23b and their associated lumens 29a, 29b is very small but seals may be used if needed, depending upon the application.

This ceramic interface enables pumping of very corrosive chemicals that might react or corrode other materials. The bushings are not limited to ceramic but may be made of any material to suit the chemical compatibility of the liquid being pumped. Ceramic is ideal for pumping sodium hypochlorite, for example, which is often used in water treatment plants and pulp and paper plants.

Figure 7:
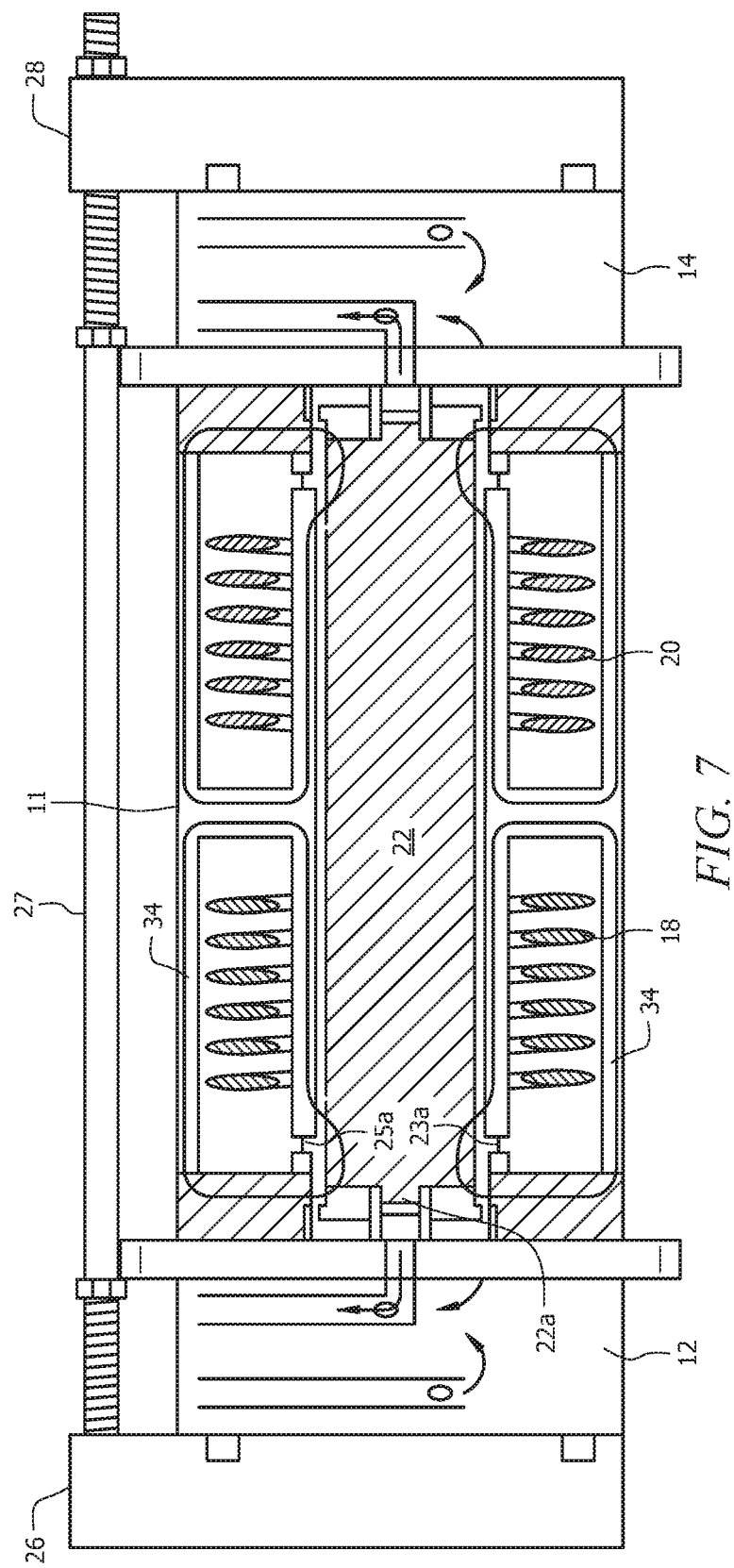
FIG. 7 is a cut-away view of the first embodiment, depicting increased structural detail.

FIG. 7 depicts an embodiment similar to the embodiment of FIG. 1. It differs in that it includes a non-magnetic bushing 17a positioned in central bore 16a of end wall 12. A similar bushing is provided at end wall 14 as well but FIG. 7 is simplified and does not depict that end wall. Each bushing provides an interface between the end wall central bore and its associated end piston 22a, 22b and provides a stop that prevents central piston 22 from entering into central bore 16a or 16b.

The FIG. 7 embodiment also differs from the FIG. 1 embodiment by disclosing an increased level of structural detail, e.g., housing 11 is depicted having an inner compartment 11a that defines axial bore 16. End wall 12 (and undepicted end wall 14) define a first magnetic pole and inner compartment 11a defines a second magnetic pole. Annular magnetic gap 23a spaces said magnetic poles apart from one another and non-magnetic annular seal 25a fills that gap. Piston 22 bridges the gap between main body inner compartment 11a and end walls 12, 14.

Magnetic gap 23a is important because a magnetic force following a magnetic path in the form of a loop will attempt to complete the loop. Reference numeral 34 in FIG. 7 denotes the path of travel of the magnetic force.

The objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:
1. A positive displacement inductive pump, comprising:
a housing formed of a ferromagnetic material;
said housing including an axial bore formed in said housing;
first and second stationary end walls secured to opposite ends of said housing, said first end and second end walls having a magnetic field;
a central bore formed in each of said end walls,
said axial bore and said central bores of said end walls having a common longitudinal axis of symmetry;
said central bores of said end walls forming a displacement chamber within said first and second end walls;

a central piston formed of a ferromagnetic material disposed in the axial bore;

non-ferromagnetic end pistons extending from opposite ends of said central piston, said end pistons and said central piston having a common longitudinal axis of symmetry;

each end piston being slideably received within an associated end wall central bore;

each end piston having a length greater than the depth of its associated end wall central bore, thereby preventing the central piston from contacting or residing within each of the end walls;

first and second inductive coils disposed in the housing around the axial bore between the end walls and coaxial with the axial bore; and each of said coils being alternately energized to produce respective first and second magnetic fields causing the central piston to reciprocate within the axial bore and causing each end piston to simultaneously reciprocate within said associated end wall central bore, respectively.

2. The positive displacement inductive pump of claim 1, further comprising:

first and second check valve assemblies respectively attached to an outboard end of said end walls and in communication with said central bores of said end walls to alternately open and close said central bores to allow ingress and egress of a fluidic material into and out of the central bores as said central piston and said end pistons reciprocate conjointly with one another.

3. The positive displacement inductive pump of claim 1, further comprising:

a seal secured to an outer surface of each end piston to form a seal between each end piston outer surface and the inner surface of its associated central bore.

4. The positive displacement inductive pump of claim 1, further comprising:

said end pistons and the central bores within which they are slideably received having diameters that are less than a diameter of said central piston.

5. The positive displacement inductive pump of claim 1, further comprising:

said central piston, said end pistons, and said end walls each include a predetermined material that does not react with the fluidic material being pumped by said pump.

6. The positive displacement inductive pump of claim 5, wherein said predetermined material is ceramic.

7. The positive displacement inductive pump of claim 1, further comprising:

said housing having an inner compartment formed of a ferromagnetic material, said inner compartment defining said axial bore.

\* \* \* \* \*